INHIBITING FALSE SIGNALS IN ELECTRONIC GAUGING

Filed Dec. 23, 1960 2 Sheets-Sheet 1

INVENTOR.
ELLSWORTH M. MURLEY, JR.
BY W. A. Schaich &
Charles S. Lynch
ATTORNEYS

INHIBITING FALSE SIGNALS IN ELECTRONIC GAUGING

Filed Dec. 23, 1960 2 Sheets-Sheet 2

INVENTOR.
ELLSWORTH M. MURLEY, JR.
BY W. A. Schaich &
Charles S. Lynch
ATTORNEYS 3,048,269

INHIBITING FALSE SIGNALS IN ELECTRONIC GAUGING

Ellsworth M. Murley, Jr., Toledo, Ohio, assignor to Owens-Illinois Glass Company, a corporation of Ohio Filed Dec. 23, 1960, Ser. No. 78,063

4 Claims. (Cl. 209—74)

This invention relates to electronic gauging and particularly to pulse type electronic gauging such as is used to detect defects in hollow glass containers.

It is customary in the inspection of articles, such as hollow glass containers, to use pulse type electronic gauging apparatus wherein a defect creates an electronic signal that energizes a reject mechanism. In such electronic gauging severe power line voltage variations often cause false signals.

It is therefore an object of this invention to provide a method and apparatus for inhibiting the false signals due to power line voltage variations from causing false energization in pulse type electronic gauging.

Basically, the invention comprises creating a pulse in response to a variation in line voltage and causing that pulse to condition an inhibiting circuit so that when the false pulse signal due to line voltage variation passes through the pulse type electronic gauging apparatus, it will be prevented from passing to the reject mechanism by the inhibiting circuit.

Figure 1:
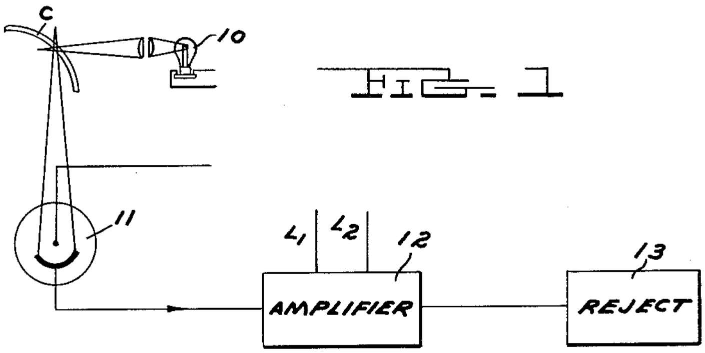
FIG. 1 is a schematic diagram of a pulse type electronic gauging apparatus.

Referring to FIG. 1, a typical pulse type electronic gauging apparatus is shown for inspecting the rim of a container C for defects. A beam of light from a source 10 is condensed into a spot on the rim of the container and the container is rotated relative to the beam. A defect in the rim causes the light to be reflected to a light sensitive device such as a photocell 11 which creates a signal that is amplified by amplifier 12 and caused to energize a reject mechanism 13 such as a solenoid. Such pulse type gauging apparatus is shown in the patents to Owens 2,481,863, Fedorchak et al. 2,682,802 and Fedorchak 2,753,459. Variations in line voltage tend to cause false signals in such apparatus, thereby rejecting containers which do not contain defects.

Figure 2:
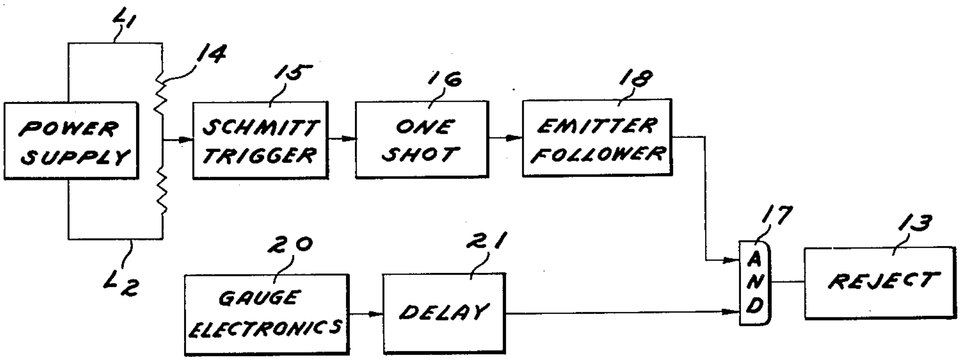
FIG. 2 is a schematic diagram of the electronic circuit embodying the invention.
Figure 3:
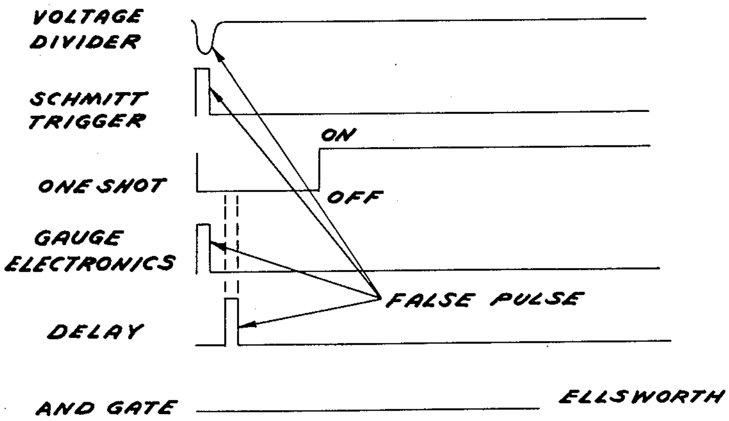
FIG. 3 is a wave diagram of the electronic apparatus.

In accordance with the invention, an inhibiting circuit is adapted to be positioned and interposed between the amplifier 12 and the reject mechanism 13. As shown diagrammatically in FIG. 2, the inhibiting circuit comprises a voltage divider 14 that is applied across the power lines $L_1$, $L_2$. Any variation in line voltage is supplied to a Schmitt trigger 15 that produces a digital pulse which, in turn, energizes a one shot or monostable multivibrator 16 and produces a negative pulse of predetermined width (FIG. 3). This pulse is fed to one leg of an "and" gate 17 by an emitter follower 18. A false pulse signal due to the line voltage variation also passes through the electronic gauging apparatus, diagrammatically shown as 20, and after passing through a suitable time delay 21, is provided to the other leg of the "and" gate 17 slightly after the pulse from the voltage divider 14. The pulse from the voltage divider 14 disables the "and" gate 17 which is normally "on" thereby preventing the false signal from the gauge electronics 20 from passing on to the reject mechanism 13. If no false signal is produced, then the "and" gate 17 remains in "on" position and the normal gauging pulse from the gauging electronics 20 passes to the reject mechanism 13.

The action of the inhibiting circuit is shown in terms of wave forms in FIG. 3.

Figures 4, 5:
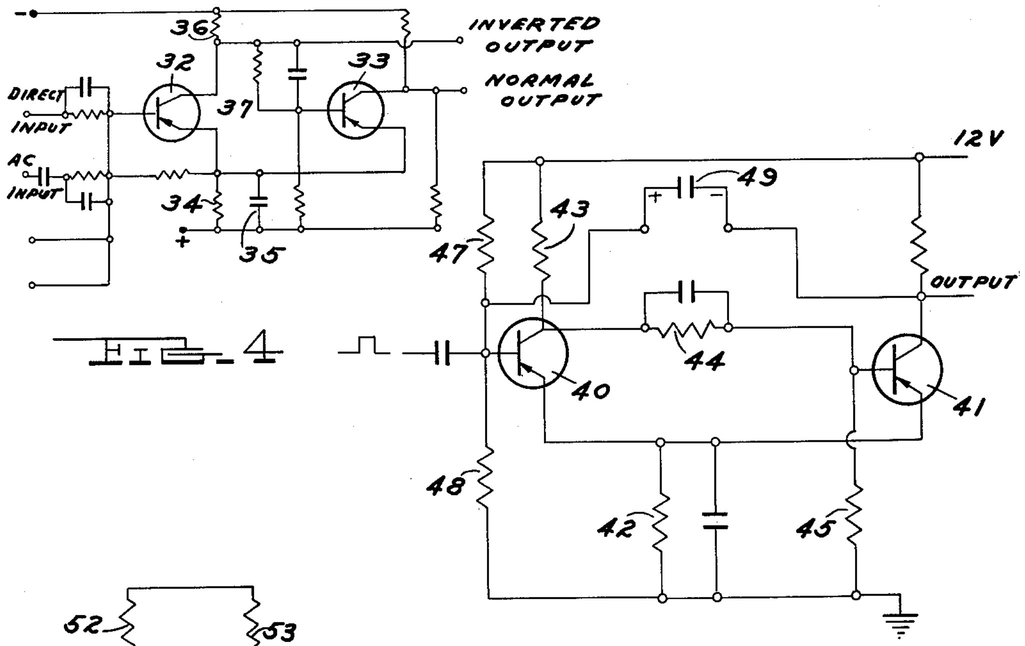
FIG. 4 is a schematic wiring diagram of the Schmitt trigger used in the electronic apparatus.
FIG. 5 is a schematic wiring diagram of the one shot multivibrator used in the electronic apparatus.

A typical circuit for the Schmitt trigger is shown in FIG. 4 and comprises transistors 32, 33. Transistor 32 is assured to be in the cut-off position because the two transistors are emitter coupled by resistor 34 and capacitor 35. The current flowing through the second transistor 33 causes a voltage drop through resistor 34 which makes the emitter of the first transistor 32 negative with respect to its base. Thus, the transistor 32 is reversed biased. Transistor 33 is forward biased from the collector load resistor 36 of the transistor 32 and the resistor 37 connecting the load resistor in the base of the second transistor 33. In its quiescent state, the first transistor 32 is cut off and the second transistor 33 is saturated. The small amount of cut-off current in the first transistor 32 causes a slight voltage drop across its collector load 36 clamping the output at a negative voltage.

When a negative pulse is applied at the point called A.C. input, the first transistor 32 becomes forward biased and begins to conduct. At the same time, the voltage drop across its load resistor 36 is reduced. This regenerative action continues until the first transistor 32 is saturated and the second transistor 33 is cut off. When this happens, the point titled inverted output is at a lesser voltage than before. When the input pulse at A.C. input is removed, the reverse bias is again applied to the first transistor 32 and the circuit restores itself to its original condition.

A typical circuit for the one shot or monostable multivibrator is shown in FIG. 5. In such a circuit when transistor 40 is conducting, transistor 41 is cut off. The cut off for the transistor 41 is provided by the voltage drop across resistance 42 and the voltage drop across resistances 43, 44 and 45. This causes a reverse bias of transistor 41 cutting it off. Cut-off current through transistor 45 clamps the output to a predetermined voltage. Transistor 40 is held in saturation by voltage divider 47, 48 which forward biases transistor 40.

When a positive pulse is applied, transistor 40 conducts less. As a result, the drop across resistance 43 decreases and transistor 41 becomes forward biased and begins to conduct. This action continues until transistor 40 is cut off and transistor 41 is conducting. At the same time, transistor 40 is held at cut off by capacitor 49 which has been charged as shown. The capacitor charge holds transistor 40 to cut off. Capacitor 49, however, discharges exponentially through resistance 47. As soon as the reverse bias is removed from transistor 40 by the discharge of capacitor 49, it will begin to conduct thus cutting off transistor 41 and restoring the circuit to its original condition. The output pulse width is controlled by the time constant of resistance 47 and capacitor 49.

Figure 6:
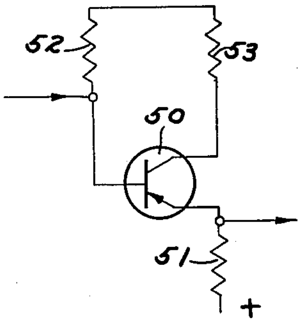
FIG. 6 is a wiring diagram of the emitter follower used in the electronic apparatus.

A typical circuit for the emitter follower is shown in FIG. 6 and comprises roughly the transistor equivalent of a cathode follower. The emitter follower comprises a transistor 50, the base of which is clamped to a predetermined negative voltage. When the input corresponds to this voltage, the voltage drop across resistor 51 corresponds to the same voltage. When the input is at a lesser negative voltage, the transistor conducts less and the output rises to the corresponding lesser voltage. Resistance 52 provides bias to the transistor 50. Resistance 53 helps establish the direct current level in the output which is at a lower impedance than the input.

Figure 7:
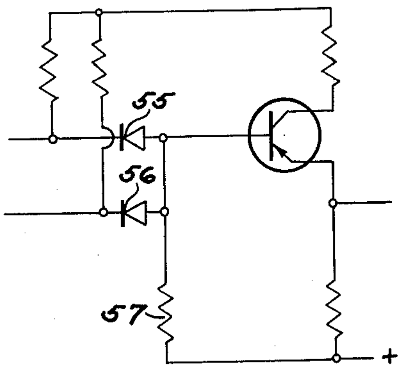
FIG. 7 is a wiring diagram of the "and" gate used in the apparatus.

A typical circuit of the "and" gate is shown in FIG. 7 and comprises what is commonly known as a coincident gate or a direct coupled gate. The gate is adapted to be open except when a transient signal due to a line voltage variation is provided. Both diodes 55, 56 are forward biased by the supply voltage and resistor chain. Current will flow through the diodes clamping the voltage across the resistor 57 at a given level. If a positive pulse appears on either input that diode will be reversed biased and will not conduct. However, the other diode will continue to conduct and the voltage across resistor 57 will remain clamped at its original value. If both inputs receive a positive pulse simultaneously, both diodes will be reversed biased and the voltage drop across the resistor 57 will rise producing an output pulse. The output is fed to an emitter follower which operates in the manner described with reference to FIG. 6.

It can thus be seen that there has been provided a method and apparatus for inhibiting false signals from causing a false rejection of articles which are being inspected by pulse type electronic methods.

I claim:

1. An apparatus for inhibiting a false pulse signal due to variations in line voltage from passing through a pulse type electronic article gauging apparatus which comprises an "and" gate which is normally "on," first circuit means forming a pulse due to variation in line voltage and applying said pulse to said "and" gate to disable said "and" gate, and circuit means associated with said "and" gate for receiving a pulse from said electronic gauge apparatus whereby said "and" gate is disabled by a false pulse signal from said first circuit means and prevented from passing the false pulse signal which passes through the electronic gauging apparatus.

2. The combination set forth in claim 1 wherein said first circuit means comprises a Schmitt trigger for converting said variation in line voltage to a pulse, a monostable multivibrator adapted to be energized by a signal from said Schmitt trigger, and an emitter follower for transmitting said signal to said "and" gate.

3. The combination set forth in claim 2 including a voltage divider extending across the power supply for receiving said variation in line voltage and applying it to said Schmitt trigger.

4. An apparatus for inhibiting a false pulse signal due to variations in line voltage from passing through a pulse type electronic article gauging apparatus which comprises an "and" gate which is normally "on," a pulse type electronic article gauging apparatus including an electronic gauging device reject mechanism, said "and" gate being interposed electrically between said electronic gauging device and said reject mechanism, first circuit means forming a pulse due to variation in line voltage and applying said pulse to said "and" gate to disable said "and" gate, and circuit means associated with said "and" gate for receiving a pulse from said electronic gauge apparatus whereby said "and" gate is disabled by a false pulse signal from said first circuit means and prevented from passing the false pulse signal from the gauging device to the reject mechanism which passes through the electronic gauging apparatus.

References Cited in the file of this patent

UNITED STATES PATENTS

| | | |
|---|---|---|
| 2,767,839 | Frommer | Oct. 23, 1956 |
| 2,939,963 | Rideout | June 7, 1960 |